(12) United States Patent
Cardwell et al.

(10) Patent No.: US 6,517,709 B1
(45) Date of Patent: Feb. 11, 2003

(54) CATCH BASIN EROSION CONTAINMENT FILTER ASSEMBLY

(76) Inventors: Troy Cardwell, 32377 Woodson La., Cottage Grove, OR (US) 97424; Casey Cardwell, 4473 Hilton Dr., Eugene, OR (US) 97402; Cory Cardwell, 1635 Crescent Ave., Eugene, OR (US) 97408

( * ) Notice: Subject to any disclaimer, the term of this patent is extended or adjusted under 35 U.S.C. 154(b) by 19 days.

(21) Appl. No.: 09/760,153

(22) Filed: Jan. 11, 2001

Related U.S. Application Data

(60) Provisional application No. 60/176,347, filed on Jan. 14, 2000.

(51) Int. Cl.[7] .............................. E03F 5/06; E03F 5/14; B01D 29/25; B01D 29/37
(52) U.S. Cl. ..................... 210/164; 210/170; 210/232; 210/474; 210/477
(58) Field of Search ................................ 210/163, 164, 210/232, 170, 474, 477

(56) References Cited

U.S. PATENT DOCUMENTS

| | | | |
|---|---|---|---|
| 4,419,232 A | * | 12/1983 | Arntyr et al. |
| 5,372,714 A | | 12/1994 | Logue, Jr. |
| 5,575,925 A | | 11/1996 | Logue, Jr. |
| 5,733,445 A | | 3/1998 | Fanelli |
| 5,985,157 A | * | 11/1999 | Lecknet et al. |
| 6,086,758 A | * | 7/2000 | Schilling et al. |
| 6,149,803 A | * | 11/2000 | Diloreto, Jr. et al. |
| 6,274,036 B1 | * | 8/2001 | Ellis |
| 6,294,095 B1 | * | 9/2001 | Lewis |

OTHER PUBLICATIONS

"Innovative Stormwater Treatment Products & Services Guide" Stormwater Trade Shows, Nov. 19, 1997.*
Complete Environmental Products, Inc., "Environmental Containment on Spill Response Products", Cover page & pp. 18 & 19; Date Publisher Unknown.

* cited by examiner

*Primary Examiner*—Thomas M. Lithgow
(74) *Attorney, Agent, or Firm*—Robert E. Howard

(57) ABSTRACT

A catch basin erosion containment filter assembly. The filter assembly includes a rigid frame and a containment bag attached at its open end to the frame. The frame is adapted to be seated and/or held in the horizontal or vertical opening to a catch basin. The bag has one or more layers, preferably at least two layers. The outer layer is preferably a woven geotextile fabric and the inner layer is preferably a nonwoven geotextile fabric. A hydrocarbon absorbent layer, such as a nonwoven oileophilic fabric, may be located between the inner and outer layers for capturing spilled fuel and/or oil.

12 Claims, 5 Drawing Sheets

CATCH BASIN EROSION CONTAINMENT FILTER ASSEMBLY

CROSS-REFERENCE TO RELATED APPLICATIONS

This application claims the benefit of U.S. Provisional Application No. 60/176,347, filed Jan. 14, 2000.

BACKGROUND OF THE INVENTION

This invention relates to a catch basin erosion containment filter assembly.

Water runoff from construction sites may find its way into the catch basin of a storm water sewer system. Such water may be contaminated with mud and debris generated by construction or other activities, and may also be contaminated with oil or fuel.

It is highly desirable that such contaminants be prevented from entering the sewer system.

It is known to place bags filled with bark and chips in front of the catch basin to capture such contaminants.

It has also been suggested to place a filter material on top of or beneath the grate covering the catch basin.

SUMMARY OF THE INVENTION

It is an object of this invention to provide a filter assembly that can be inserted into the catch basin at the entrance thereof to capture sedimentary contaminants entering with the water runoff.

It is a further object to provide a filter structure that can also capture hydrocarbon contaminants such as fuel and/or oil entering with the water runoff.

The filter assembly of this invention is comprised of a frame and a containment bag attached to the frame at its open end. Although the containment bag can be formed of a single layer of material, it is preferred that the containment bag be a laminate having at least two layers, the outer layer having a higher porosity and higher strength than the inner layer.

The outer layer is preferably a woven geotextile. The inner layer is preferably a nonwoven geotextile.

The laminate of the filter structure may have a fuel/oil absorbent intermediate layer. The intermediate layer is preferably a melt blown polyolefin such as polypropylene.

DESCRIPTION OF PREFERRED EMBODIMENTS

Figure 1:
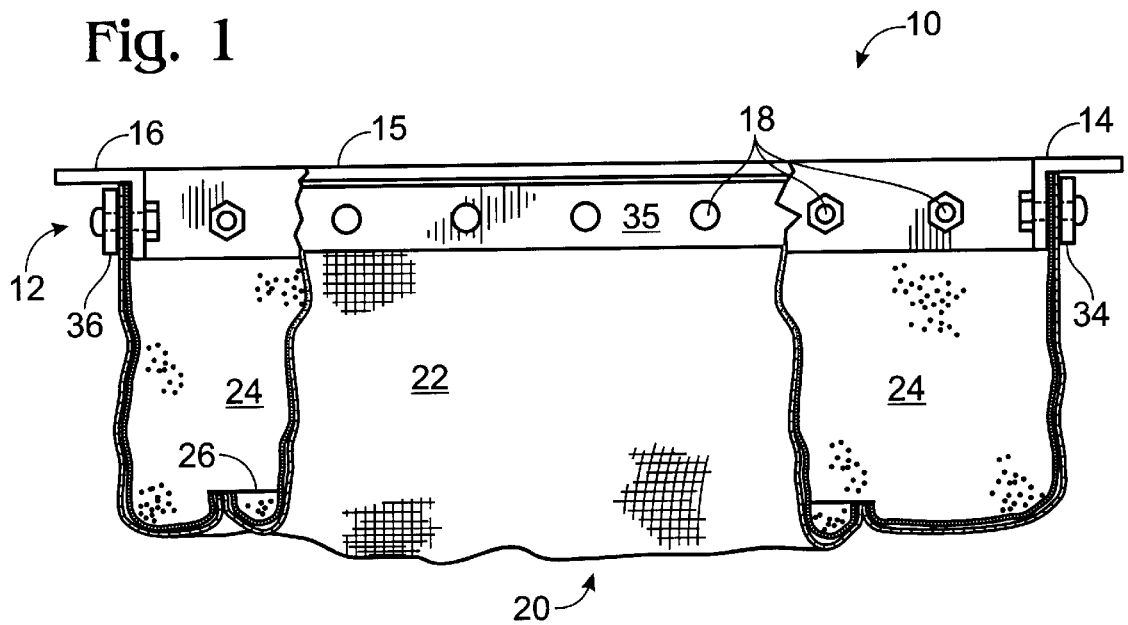
FIG. 1 is a side view, partially cut away, of a shallow version of the containment filter assembly of this invention.
Figure 2:
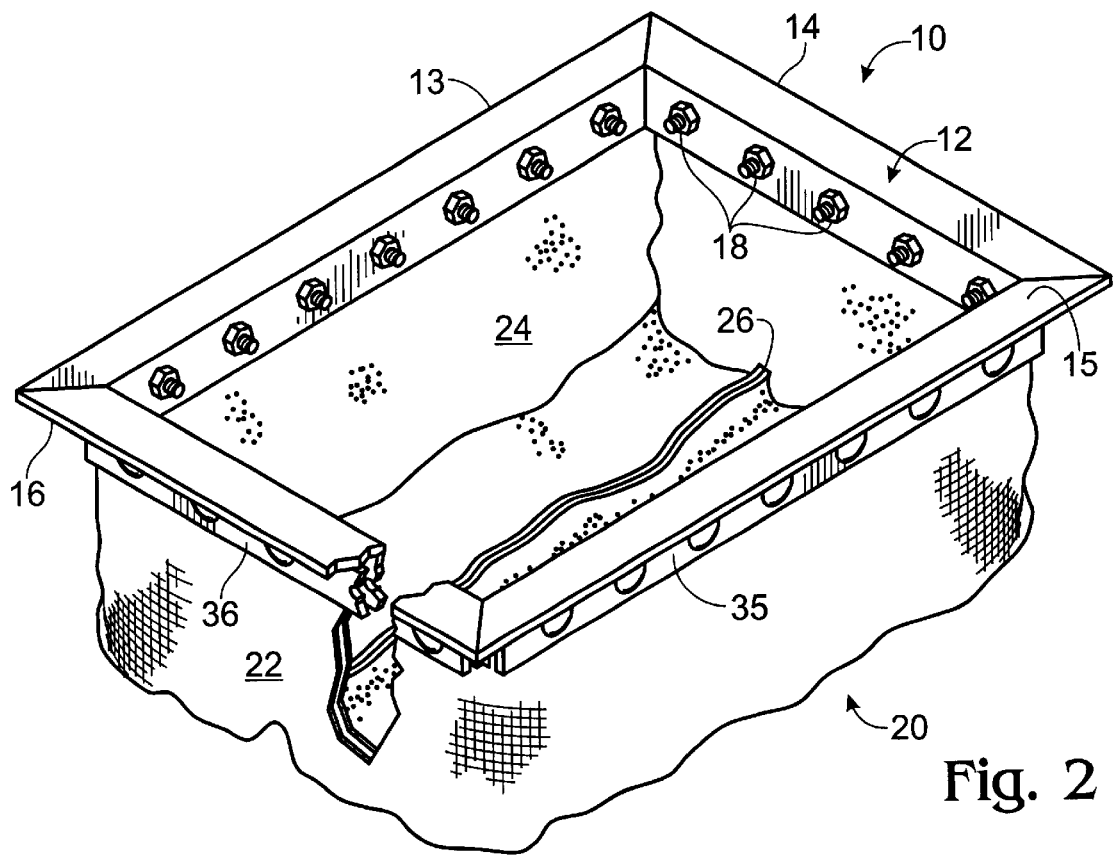
FIG. 2 is a perspective view of the shallow version of the containment filter assembly of this invention.

A shallow version of the containment filter assembly 10 of this invention is shown in FIGS. 1 and 2. Containment filter assembly 10 has a rectangular frame 12 comprised of four upside down L-shaped frame members 13, 14, 15, and 16, each of said upside down L-shaped frame members Shaving an upper horizontal leg and a vertical downwardly extending leg, as shown. Frame members 13–16 are attached together at their junctures by welding or other attachment means to form a rectangular configuration.

Attached to rectangular frame 12 is a containment bag 20 comprised of an outer layer 22 and an inner layer 24. The bag 20 can be formed from layers 22 and 24 by any conventional bag making method.

The outer layer 22 and inner layer 24 can be laminated together prior to bag assembly (the phrase "laminated" including merely laying one layer on top of the other) or, alternatively, separate bags could be formed from each of outer layer 22 and inner layer 24 and containment bag 20 formed by placing the bag formed of the inner layer 24 inside the bag formed of the outer layer 22. In the embodiment illustrated in FIGS. 1 and 2, outer layer 22 and inner layer 24 are sewn together at their bottom juncture 26.

Containment bag 20 is attached to frame 12 by abutting the upper edges of bag 20 against the outer walls of the vertical legs of L-shaped frame members 13–16, as shown. Metal strips are placed against the outer upper edges of bag 20 opposite the outer surfaces of vertical legs of L-shaped frame members 13–16 (only metal strips 34, 35 and 36 being shown), and all of the metal strips (including metal strips 34–36 and the metal strip adjacent frame member 13, not shown) fastened to the outer walls of the vertical legs of L-shaped frame members 13–16 by a plurality of suitable fastening means 18, such as rivets or screws, passing through metal strips 3336, through the upper edges of bag 20, and through the vertical legs of L-shaped frame members 13–16, as shown.

Outer layer 22 is preferably formed of a porous, woven plastic commonly referred to as a woven "geotextile". Outer layer 22 is porous enough to allow water to flow freely therethrough but not larger solids. One such suitable material for outer layer 22 is Amoco Fabrics and Fibers Style 2002 geotextile manufactured by Amoco Fabrics and Fibers Company. This material has a permeativity of 0.05 sec when measured in accordance with ASTM Test Method D-4491.

The inner layer 24 is formed of a porous, nonwoven plastic material having a smaller pore size than outer layer 22. This material also lets water flow through but not "finer" solids, i.e., solids small enough to have passed through layer 22. Suitable materials for inner layer 24 include those commonly referred to as nonwoven geotextiles. One such suitable material for inner layer 24 is CEF Style 4545 geotextile manufactured by Amoco Fabrics and Fibers Company. This material has a permeativity of 2.1 sec when measured in accordance with ASTM Test Method D-4491.

Figure 9:
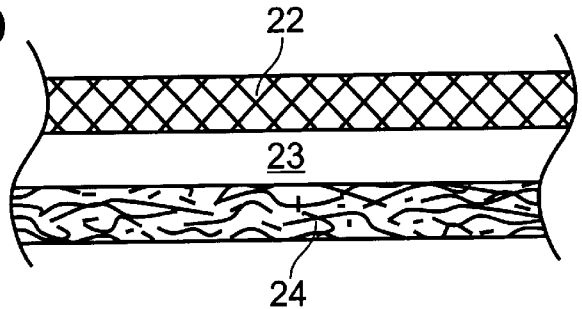
FIG. 9 is a partial cross-sectional view of the containment bag layered construction.

If it is desired to have a containment filter structure that is capable of absorbing contaminants containing hydrocarbons such as waste fuel and/or oil, a hydrocarbon absorbing layer 23 (see FIG. 9) can be inserted between outer layer 22 and inner layer 24 of bag 10. A suitable material for such a hydrocarbon absorbing layer 23 is a hydrophobic (oileophilic) nonwoven, such as a meltblown polypropylene sold by Complete Environmental Products, Inc. under the trademark CEP-R144. Since waste fuel and oil are lighter than water, the hydrocarbon absorbent layer need not extend all the way to the bottom of bag 10.

Figure 3:
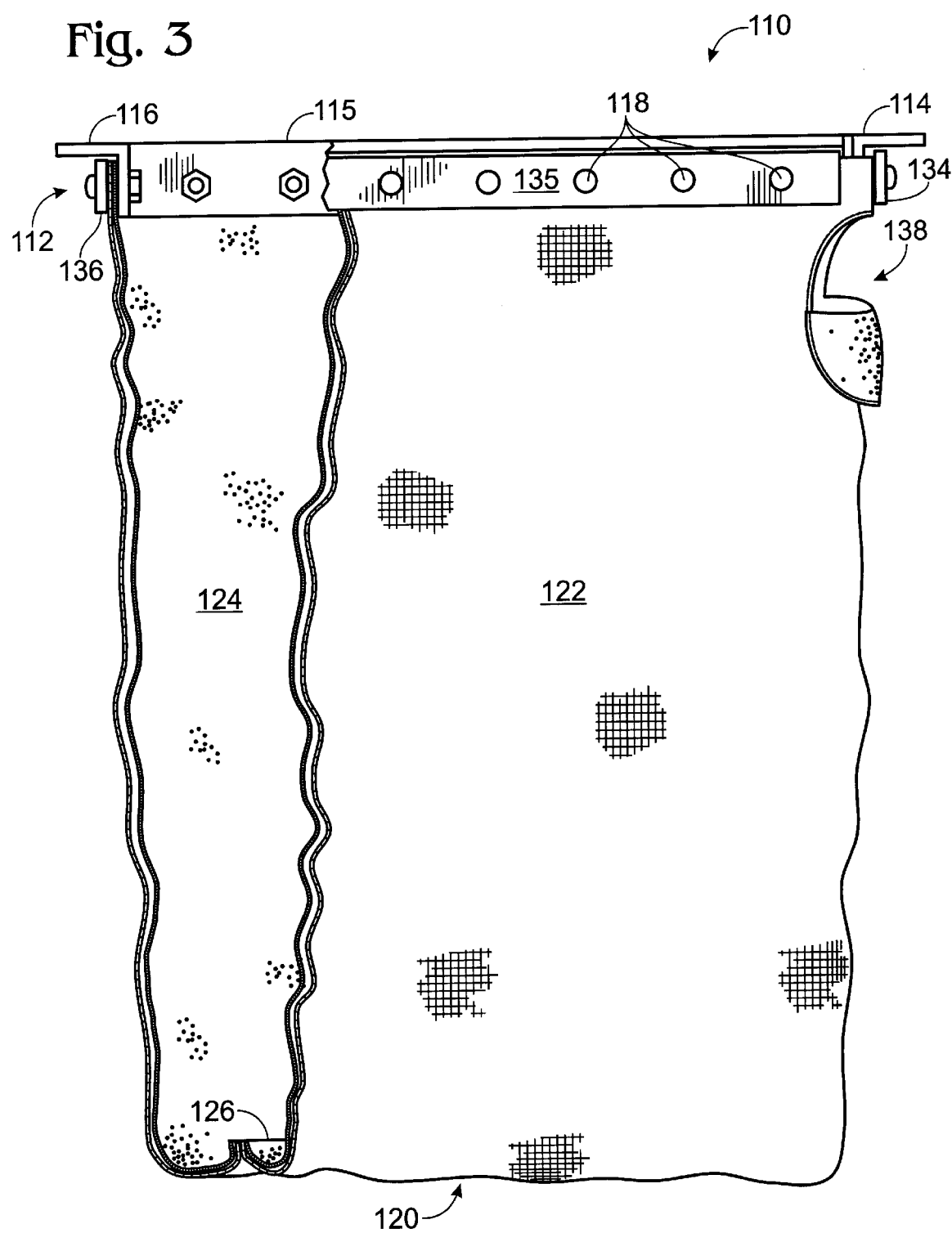
FIG. 3 is a side view, partially cut away, of a deep version of the containment filter assembly of this invention.
Figure 4:
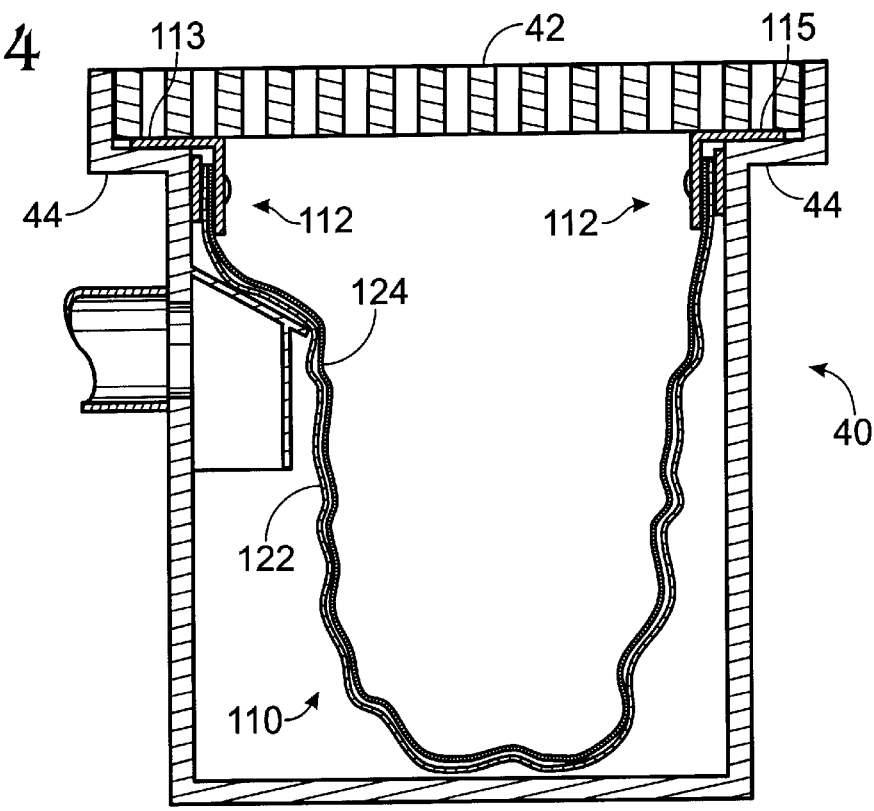
FIG. 4 is an end view, in cross section, of the deep version of the containment filter assembly of this invention shown in its operable position inside a catch basin having a horizontal entrance grate.

The shallow containment filter assembly 10 described above may be used for sites where a large amount of contamination is not expected, such as a temporary construction site. For sites where a larger amount of contamination could be generated, a deeper containment filter assembly 110 having a containment bag 120 would be used. Such a bag 120 is shown in FIGS. 3 and 4 where the reference numerals refer to the same parts as identified in FIGS. 1 and 2 except that one hundred is added thereto. Where a hydrocarbon absorbing layer (not shown) is added between outer layer 122 and inner layer 124, it preferably extends from the top of the bag down to within about one foot of the bottom of the catch basin.

The cross sectional dimensions of containment filter assemblies 10, 110 depend on the type of catch basin with which it is to be used since catch basins come in different sizes.

One added feature of the deep containment filter reassembly 110 is the provision of an overflow spout or pocket 138 located in the upper side of deep containment bag 120. Overflow spout 138 communicates the interior of bag 120 with the exterior thereof, and allows water to flow out of the bag and into the sewer system in the event the lower part of the bag 110 becomes clogged and the water level rises to the level of overflow spout 138. Such a spout may also be included in containment bag 20 of the embodiment of the invention described relative to FIGS. 1 and 2.

In FIG. 4 deep containment bag 110 is shown in its operable position inside a catch basin 40 having a horizontal entrance grate 42. As can be seen, frame 112 is of such a size that the horizontal leg portions of frame members 112–116 (only frame members 113 and 115 being shown in FIG. 4) are seated on the lip 44 of catch basin 40 that seats grate 42. Grate 42 is removed while containment bag 110 is being inserted into catch basin 40, and replaced so that it is resting on the outer surfaces of the horizontal leg portions of frame members 113–116, thereby securing containment filter assembly 110 in place.

Figure 5:
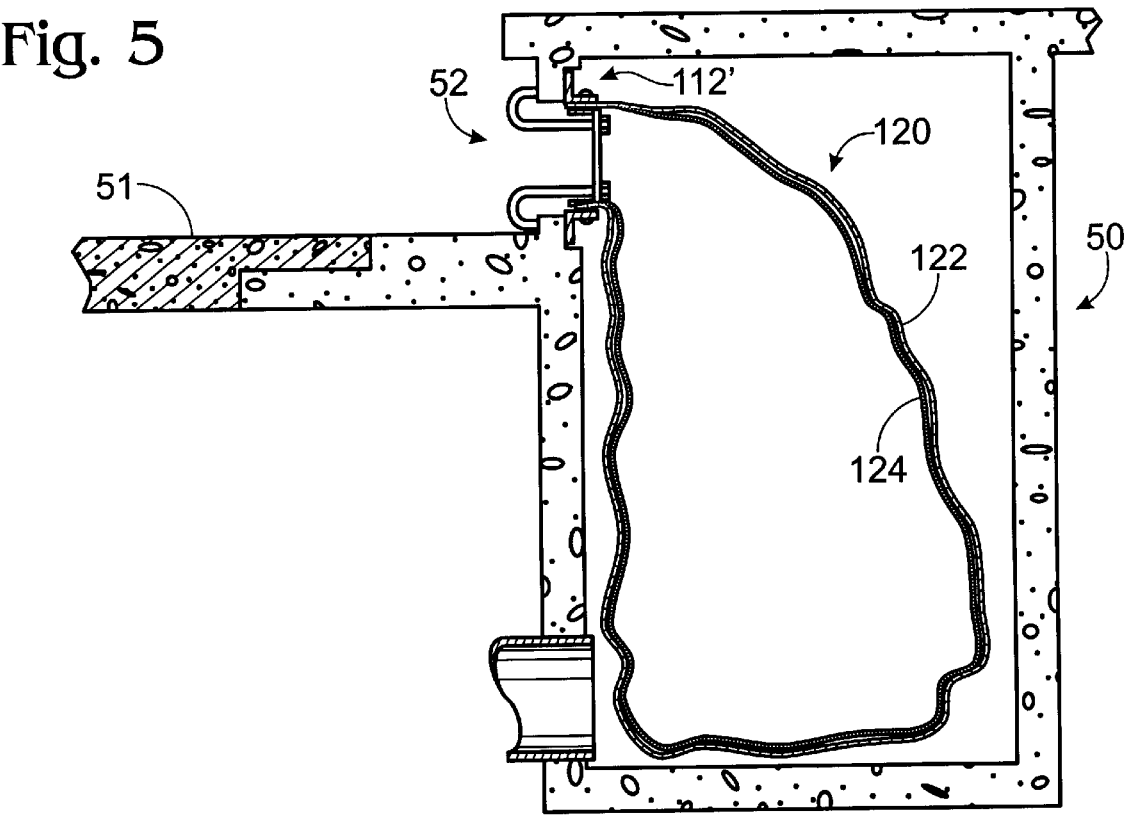
FIG. 5 is an end view, in cross section, of the deep version of the containment filter assembly of this invention shown in its operable position inside a roadway storm sewer catch basin having a vertical entrance.

In FIG. 5 a deep containment bag 120 is shown in its operable position inside a catch basin 50 adjacent a roadway 51. Catch basin 50 has a vertical entrance 52 located in the roadway curbing. Frame 112' is of such a size that it can be seated inside entrance 52, as shown. Frame 112' can be secured in place by any suitable fastening means.

Gasket material, such as roam rubber strips with adhesive backing, can be attached to either the underside or the upperside of the horizontal leg of frame members 113–116. The gasket material would be placed on the underside where containment bag 110 is to be used with a catch basin having a horizontal grate (as illustrated in FIG. 4). The gasket material would be placed on the upperside where containment bag 110 is to be used with a roadside catch basin with a vertical entrance (as illustrated in FIG. 5).

Figure 6:
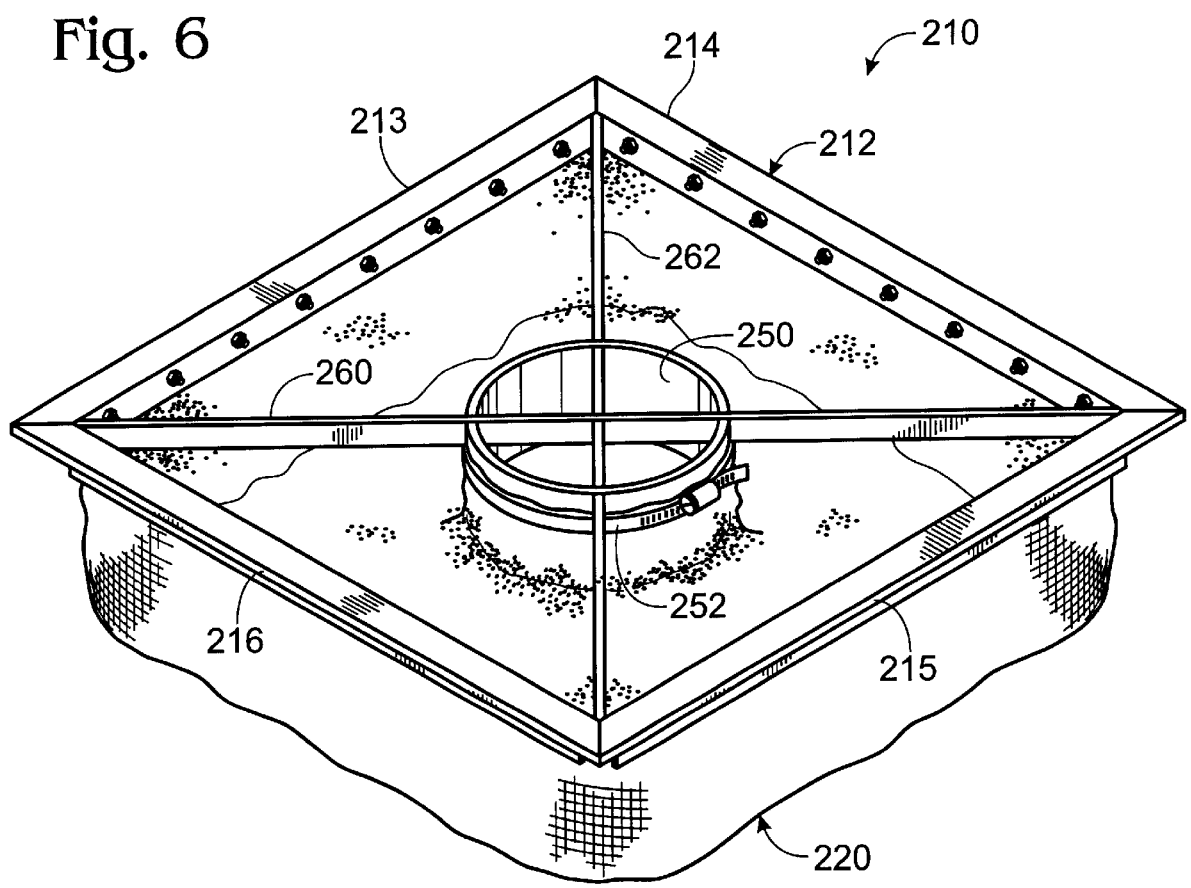
FIG. 6 is a perspective view of a containment bag having a central overflow pipe.
Figure 7:
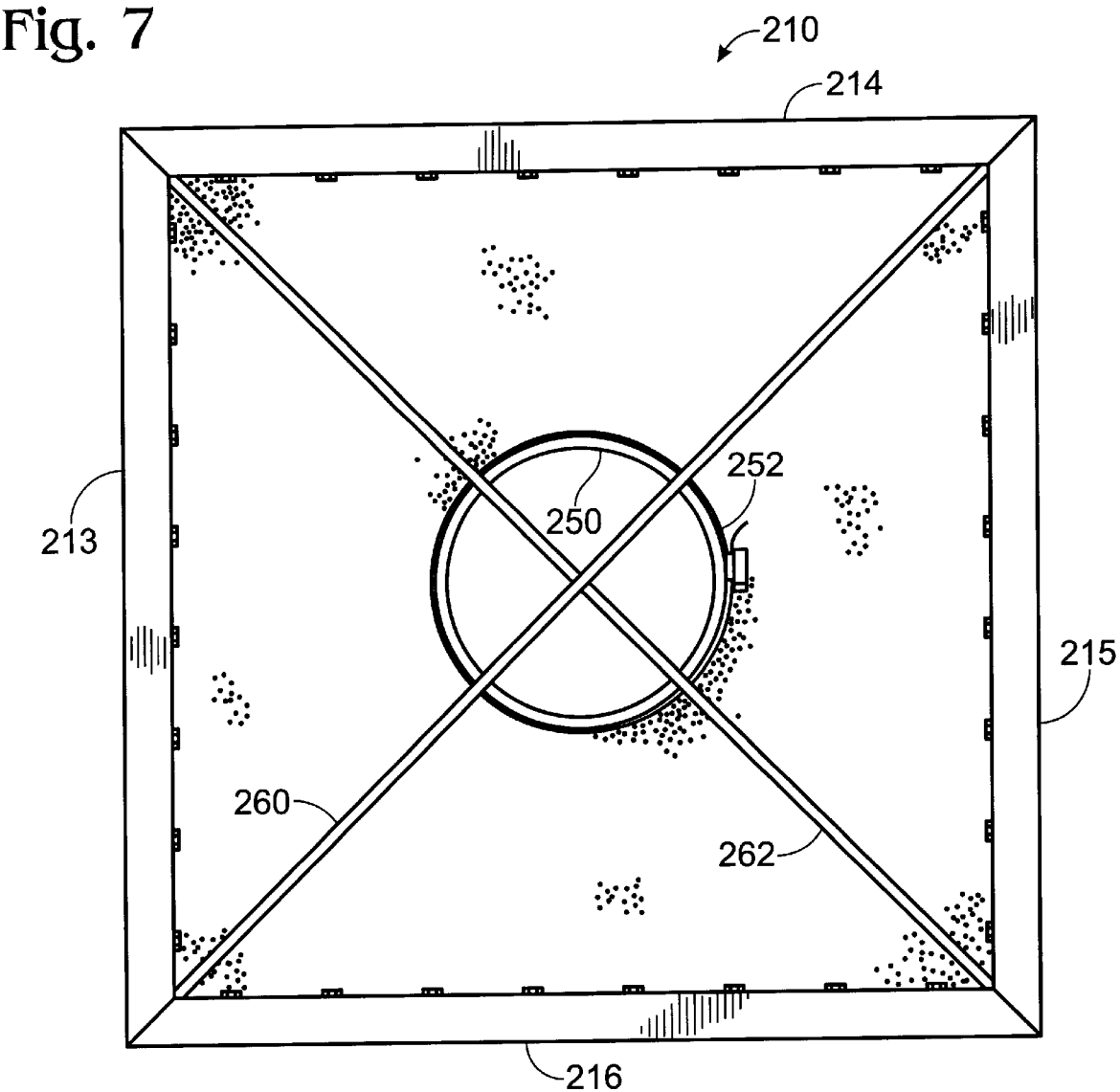
FIG. 7 is a top view of the containment bag of FIG. 6.
Figure 8:
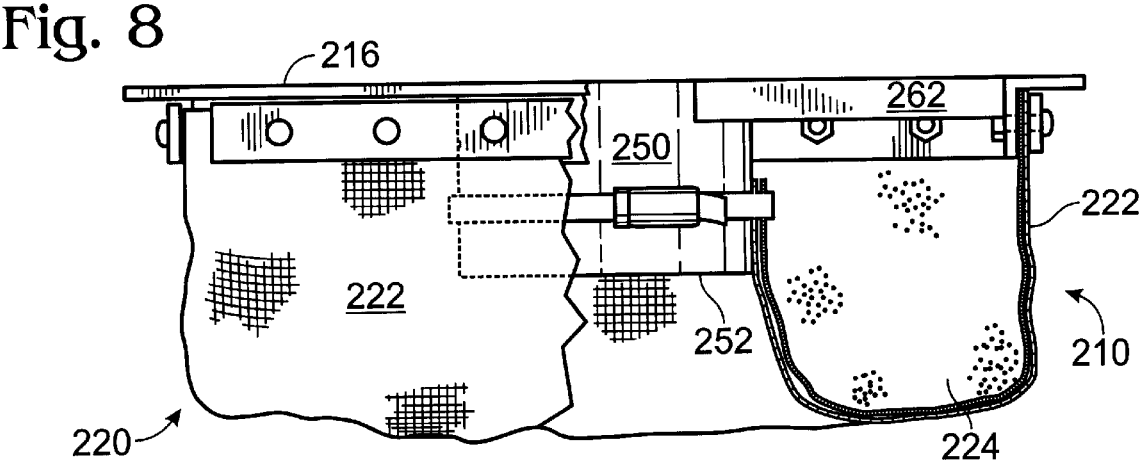
FIG. 8 is a side view, partially cut away, of the containment bag of FIG. 6.

FIGS. 6–8 illustrate a containment filter assembly 210 having a central overflow pipe 250. Reference numbers to parts similar to those described relative to the embodiment described relative to FIGS. 1 and 2 have the same reference number but increased by 200. The rectangular frame 212 is reinforced by cross bracing members 260 and 262 which are attached (such as by welding) to the corners of frame 212 at the junctures of frame members 213–216.

Tubular overflow pipe 250 is centrally positioned within filter assembly 210. Overflow pipe 250 may be held in place solely by its attachment to bag 220, as discussed below. In addition, its open upper end may be attached to cross bracing members 260 and 262 by suitable fastening means, such as welding. Bag 220 has a hole cut into the center of its bottom and the bottom fabric surrounding the hole is gathered up around the mid-portion of overflow pipe 250 and attached thereto by clamp 252, as best seen in FIGS. 6 and 8. Overflow pipe 250 communicates the interior of bag 220 with the exterior thereof. If bag 220 becomes clogged, water rising to the top thereof can escape through central overflow pipe 250 into the sewer system.

Frame 12 of the shallow version illustrated in FIGS. 1 and 2 and frame 112 of the deep version illustrated in FIGS. 3–5 can be reinforced with cross bracing in the same manner as illustrated relative to cross bracing members 260 and 262 of frame 212 of the central overflow version illustrated in FIGS. 6–8. Similarly, an overflow pipe similar to overflow pipe 250 may be used with the embodiments of the invention described in FIGS. 1 and 2 and in FIGS. 3–5.

Although frames 12, 112 and 212 have been described as being rectangular in order to be coextensive with, and seated on or against, the lips of catch basins having rectangular shaped entrances, such as those described in FIGS. 4 and 5, it is clear that for catch basins having a circular entrance shape, or other non-rectangular entrance shape, the shape and size of the frames of the various embodiments of the containment filter assembly of the present invention can be adapted to such a non-rectangular shape and size so that the frame can be seated on or against the lips of such catch basins.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An erosion containment filter assembly adapted to be placed into a catch basin at the entrance thereto comprising:
   a rigid frame adapted to be held in place at said entrance to said catch basin; and
   a containment bag having side walls, a closed bottom and an open upper end, said containment bag being attached to said frame at said open upper end, said walls and bottom of said containment bag having inner and outer layers, said outer layer being a woven geotextile having a higher porosity and strength than said inner layer.

2. The filter assembly of claim 1 wherein said inner layer of said containment bag is comprised of a nonwoven geotextile.

3. The filter assembly of claim 1 including a fuel absorption layer located between at least a portion of said inner and outer layers of said containment bag.

4. The filter assembly of claim 3 wherein said fuel absorption layer is a nonwoven oileophilic fabric.

5. The filter assembly of claim 4 wherein said nonwoven oileophilic fabric is comprised of melt blown polypropylene fibers.

6. The filter assembly of claim 1 including an overflow exit means communicating the interior of said containment bag with the exterior thereof, said overflow exit means being located adjacent the top of said containment bag, said overflow exit means being adapted to permit water reaching said overflow exit means to overflow from said containment bag into said catch basin.

7. The filter assembly of claim 6 wherein said overflow exit means is a spout located in the upper side of said containment bag.

8. The filter assembly of claim 6 wherein said overflow exit means is a pipe, said pipe extending through an opening in the bottom of said containment bag, the bottom of said containment bag surrounding said opening being attached to said pipe.

9. The filter assembly of claim 8 wherein said pipe is additionally attached to said frame.

10. The filter assembly of claim 1 wherein said frame is comprised of four upside down L-shaped frame members attached together at their junctures to form a rectangular configuration.

11. The filter assembly of claim 10 wherein said frame also includes diagonal cross bracing members extending between said junctures.

12. The filter assembly of claim 1 wherein said frame and said open upper end of said containment bag have perimeters that are coextensive.

* * * * *